No. 802,625. PATENTED OCT. 24, 1905.
A. N. CARLSON.
WEED CUTTER.
APPLICATION FILED JAN. 28, 1905.
4 SHEETS—SHEET 1.
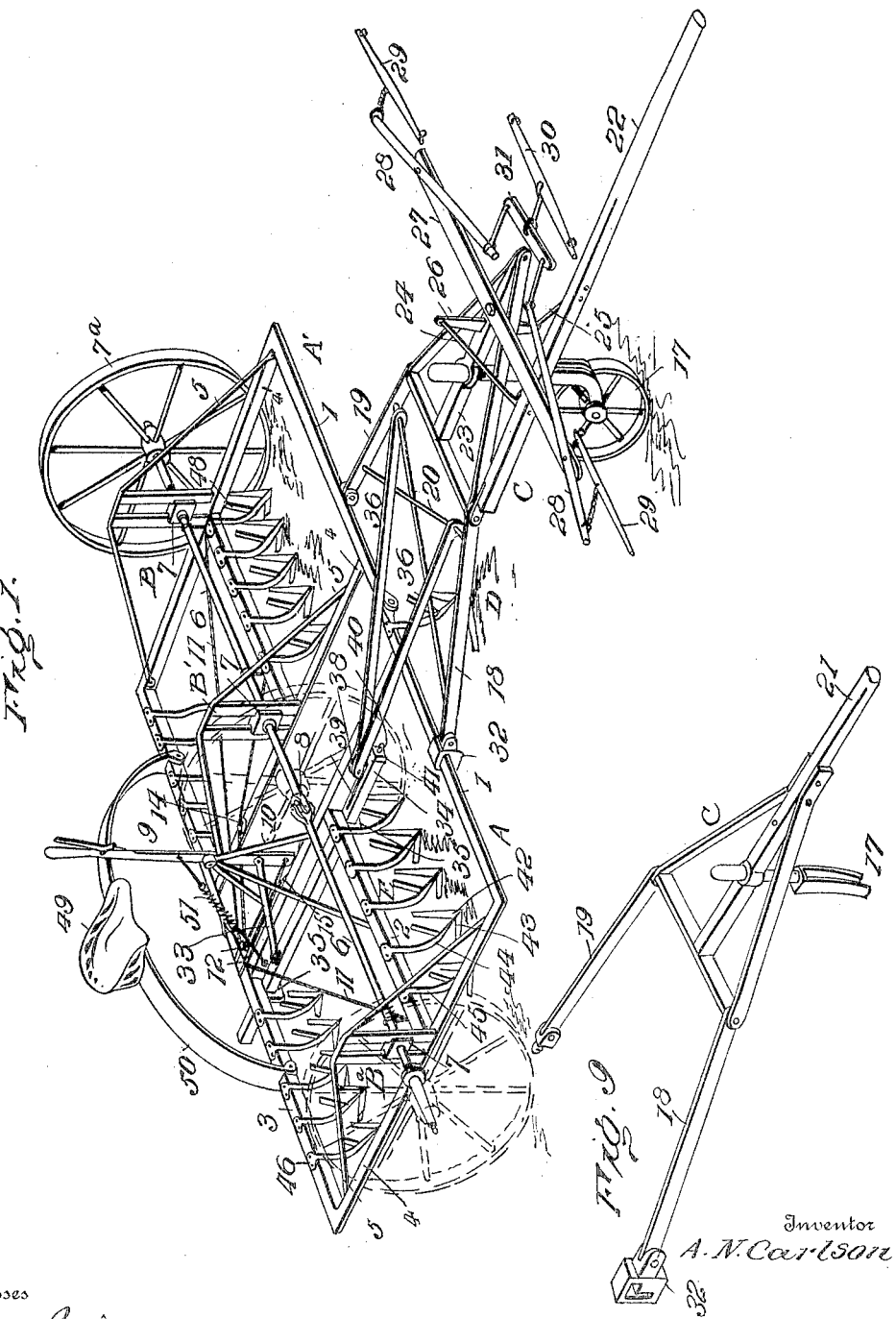
Witnesses
Inventor
A. N. Carlson
By
Attorneys

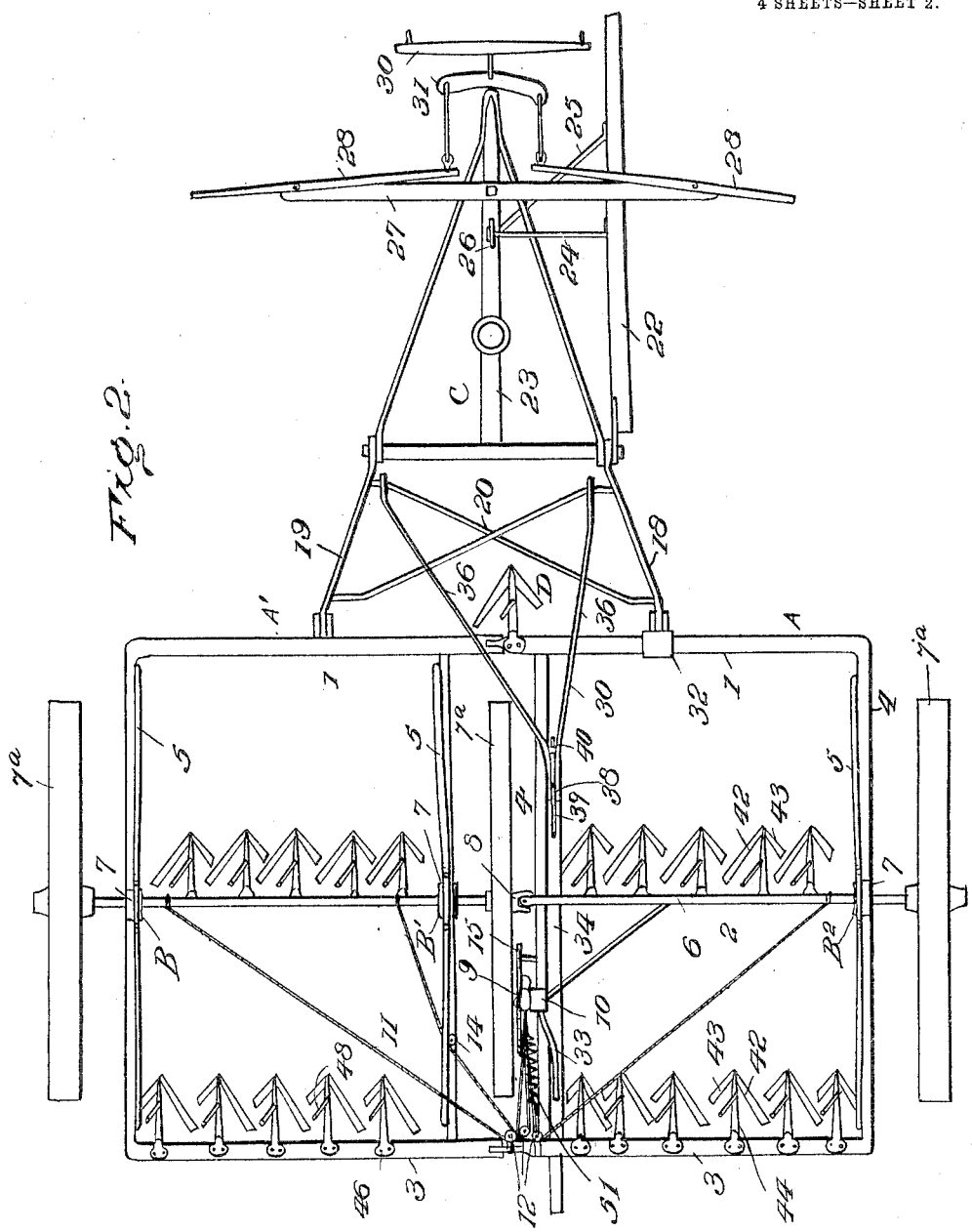

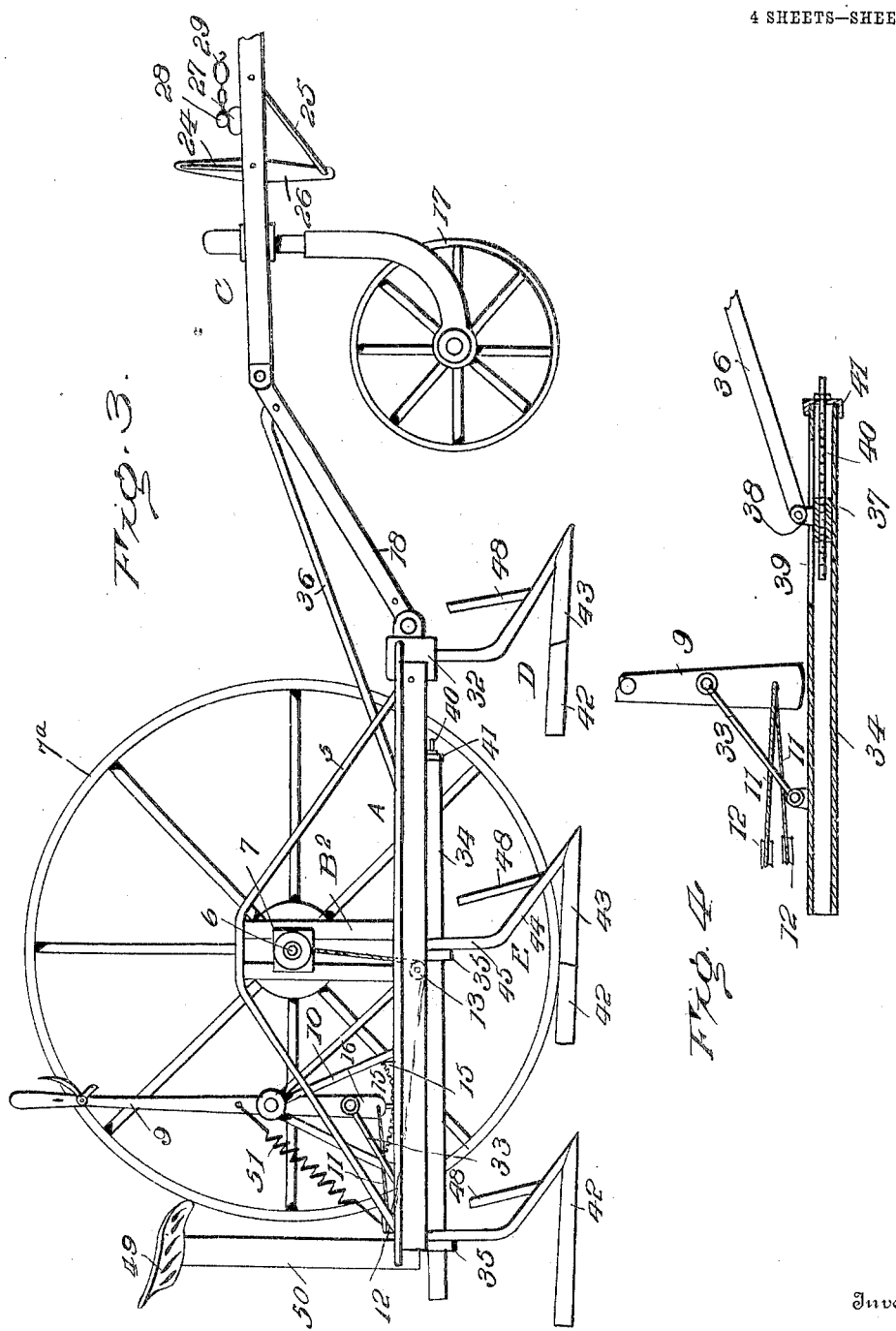

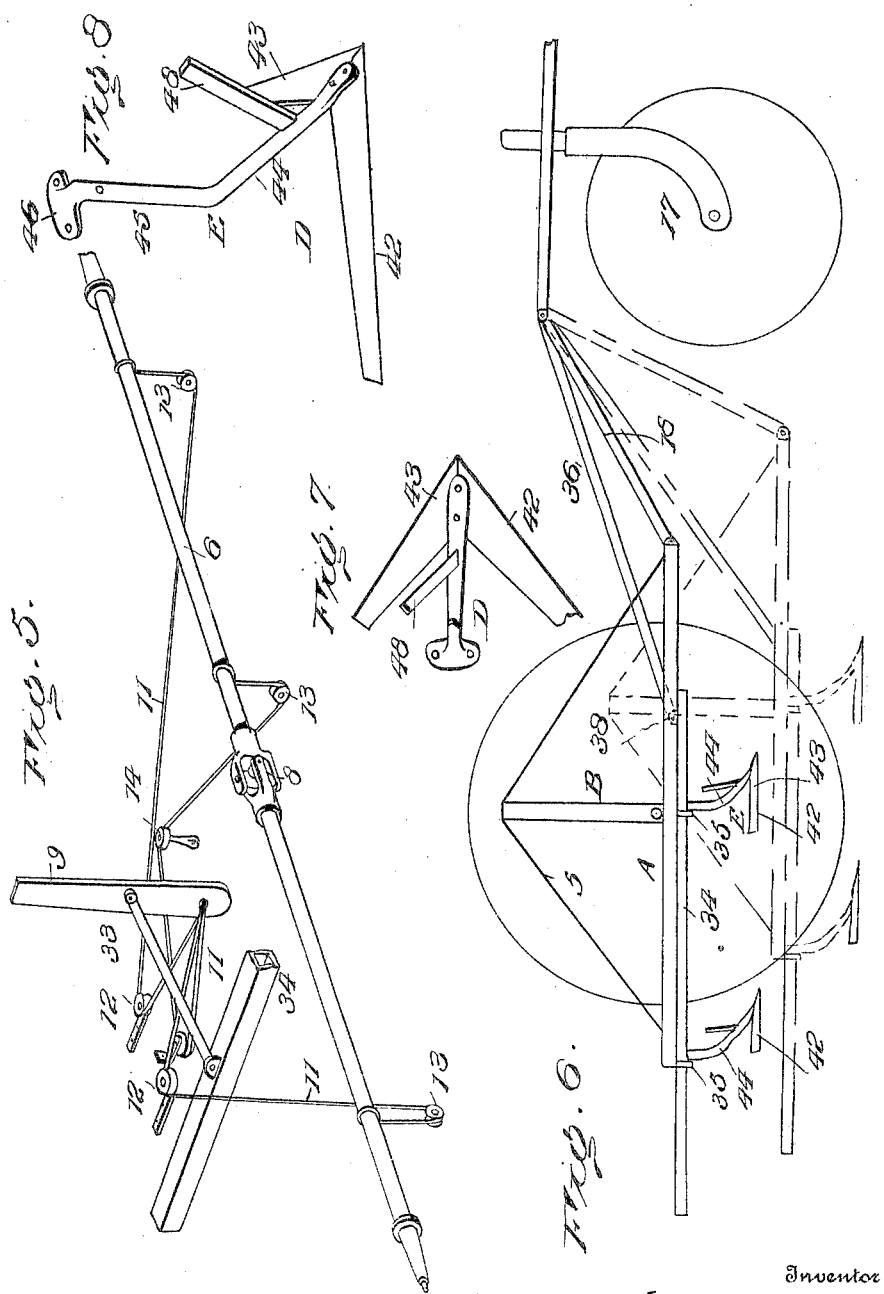

UNITED STATES PATENT OFFICE.

AXEL N. CARLSON, OF McPHERSON, KANSAS, ASSIGNOR OF ONE-HALF TO JOHN E. CARLSON, OF McPHERSON, KANSAS.

WEED-CUTTER.

No. 802,625.     Specification of Letters Patent.     Patented Oct. 24, 1905.

Application filed January 28, 1905. Serial No. 243,108.

*To all whom it may concern:*

Be it known that I, AXEL N. CARLSON, a citizen of the United States, residing at McPherson, in the county of McPherson and State of Kansas, have invented certain new and useful Improvements in Weed-Cutters, of which the following is a specification.

This invention appertains to machinery for destroying volunteer grain, weeds, and other objectionable growth tending to exhaust the soil and aims to devise a novel machine of comparatively light draft, effective in operation, self-clearing of trash, easy of manipulation, adjustable and conformable to uneven and rolling ground.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view of a weed-cutting machine embodying the invention. Fig. 2 is a top plan view of the machine. Fig. 3 is a side view of the weed-cutter. Fig. 4 is a longitudinal section of the slide-bar and coöperating parts, whereby the position of the main frame is adjusted relative to a horizontal plane. Fig. 5 is a detail perspective view of the axle and adjusting means for raising and lowering the main frame. Fig. 6 is a side view of a machine embodying the invention, showing different positions of the main frame by full and dotted lines. Fig. 7 is a top plan view of a cutter. Fig. 8 is a perspective view of one of the cutters. Fig. 9 is a detail view of the form of pole and connecting means employed when an equal number of draft-animals are employed. Fig. 10 is a detail view showing more clearly the interlocking connection between the standard of a cutter and its supporting-bar.

Corresponding and like parts are referred to in the following description and indicated in all the views of the drawings by the same reference characters.

The main frame of the machine embodies similar sections A and A', connected at their inner ends in such a manner as to articulate, whereby provision is had for ready conformation of the cutters to the nature of the surface over which the implement may be propelled. Each of the sections is preferably of approximately rectangular form and comprises a front bar 1, a middle bar 2, a rear bar 3, and longitudinal bars 4. The several bars are preferably formed of angle-iron, and the inner ends of the front and rear bars are extended and pivoted in any substantial way to admit of flexing of the sections when the machine is in operation. Guides B, B', and $B^2$ project vertically from the longitudinal bars and are located in line with the middle bars 2, each of said guides being of like construction and formed of spaced uprights. Truss-braces 5 connect the upper ends of the respective guides with, respectively, the front and rear ends of the longitudinal bars to which the guides are attached. The truss-braces connect the spaced uprights and close the upper ends of the spaces formed between them.

The axle 6 is mounted in bearings 7, slidably mounted in the respective guides B, B', and $B^2$ and is provided at its ends and at an intermediate point with ground-wheels $7^a$. A gimbal-joint 8 is provided at a medial point of the axle and is about in longitudinal alinement with the axial line of flexion between the sections A and A' to admit of the axle conforming to the flexing of the sections. The bearings mounted in the guides B and B' are secured to the axle, whereas the bearing mounted in the guide $B^2$ is loose upon the axle to admit of the latter moving longitudinally therein as the sections move upon their pivotal connections. The axle 6 is located to admit of balancing the framework of the machine thereon.

The framework provided with the cutting mechanism is vertically adjustable with reference to the axle, and for this purpose an operating-lever 9 is provided and is fulcrumed to a standard 10, extended upward from one of the sections. A series of cables 11, chains, or the like are connected at one end to the operating-lever 9 and pass around guide-pulleys 12 and 13 and are connected at the opposite end to the axle 6 and serve to transmit motion from said lever to the main frame when it is required to adjust the same vertically. The guide-pulleys 12 are attached to the rear bars of the respective sections, whereas the guide-pulleys 13 are attached to the middle bars. It is to be understood that the axle 6 occupies a given elevation above the surface of the ground, depending upon the diameter of the ground-wheels, and by reason of the adjusting-mounting of the frame upon the axle and the arrangement of the connections 11 and 13 movement of the lever 9 effects elevation of said frame, according as the cables or connections 11 are drawn upon or slackened. A guide-pulley 14, fitted to the inner longitudinal bar of the section A', deflects the middle cable or connection 11, so as to clear the middle ground-wheel. The operating-lever 9 is held in the adjusted position by means of a toothed bar 15 and latch 16 in the well-known manner.

The draft-frame C is supported by means of a caster-wheel 17 and is connected to the main frame of the machine by means of the rods or bars 18 and 19, which are connected by braces 20. The draft-frame may embody a single pole or tongue 21, as shown in Fig. 9, or two tongues 22 and 23, as shown in Figs. 1 and 2. The single-pole structure is utilized when two, four, or any equal number of draft-animals are employed. The double-pole structure is employed when three or any unequal number of draft-animals are hitched to the machine for drawing it over the field. The pole 23 is centrally disposed and corresponds to the pole 21 and supports the frame or standard of the caster-wheel. The pole 22 is arranged at one side of the pole 23 and is connected thereto by means of braces 24 and 25 and a vertical bar 26, the latter projecting approximately an equal distance above and below the pole 23 and having the ends of the respective braces 24 and 25 attached thereto. The doubletree 27 is connected to the pole 23 in the usual manner and supports equalizing-levers 28, to the outer ends of which are connected swingletrees 29, a swingletree 30, having connection with a bar 31, connected at its ends to the inner ends of the equalizing-levers 28. This arrangement of parts admits of one horse being disposed upon one side of the tongue 22 and two horses being arranged upon the opposite side of said tongue. One of the connecting rods or bars, as 19, has pivotal connection only with a section of the main frame, whereas the other rod or bar, as 18, has both a pivotal and a sliding connection with the companion section of the main frame to admit of flexing of the latter without subjecting the bars 18 and 19 to any binding action. A slide 32 is connected to the front bar of the main frame so as to move freely thereon, and the rear end of the bar 18 is pivotally connected thereto, the construction being such as to admit of the bar 1 moving freely with reference to the bar 18.

An adjusting-bar is slidably mounted with reference to the main frame to receive a rectilinear movement parallel with the line of draft and is connected with the operating-lever 9, by means of a link 33 or in any manner so as to move therewith. This adjusting-bar is indicated at 34 and is mounted in bearings 35, secured to the middle bar 2 and rear bar 3 of section A. A suitable connection is interposed between the adjusting-bar 34 and the draft-frame and serves to hold the main frame in a given position at any adjusted elevation. The connecting means between the adjusting-bar and draft-frame consist of rods or bars 36, which are forwardly diverged and pivotally mounted upon the front ends of the braces 20, the rear ends of the bars 36 converging and having adjustable connection with the bar 34, and it is to be understood that the main frame is mounted upon the axle 6 and the draft-frame upon the caster-wheel 17, and the intermediate loose connection 18 19 admits of tilting of the main frame upon the axle, whereby said main frame may occupy a horizontal position or have its front portion slightly elevated or depressed below the horizontal, according as the front cutters are required to operate shallow or deep. Proper adjustment of the rear end of the connection 36 with the main frame admits of fixing the relative position of the latter. Rearward movement of the connection 36 with reference to the main frame causes the front portion of the latter to dip or lower, whereas forward movement of said connection elevates the front portion of the main frame and correspondingly lowers the rear portion. The adjustment of the point of connection of the part 36 with the main frame is regulated by the following means: The adjusting-bar 34 is hollow and receives a nut 37, from which projects a lug 38, the latter operating in a longitudinal slot 39, formed in the top side of the bar 34. The connection 36 is pivotally attached to the lug 38, and a threaded rod 40 has screw-thread connection with the nut 37 and is connected, by means of a swivel-joint, with a cap 41, fitted to the front end of the bar 34. The projecting end of the threaded rod 40 is made angular or otherwise constructed to receive a wrench or kindred tool, by means of which said rod may be rotated to effect adjustment of the bar 34 with reference to the connection 36 and draft-frame C, whereby the main frame may occupy a horizontal position or be raised or lowered at its front end to meet existing requirements.

The cutters D are of like formation and are attached to the transverse bars of the frame in such a manner as to cover every portion of the ground over which the machine may be propelled. A single cutter is attached to the front bar of the main frame at one side of the pivotal connection between the sections, so as to operate in front of the middle ground-wheel. A series of cutters are attached to the middle and rear of the bars, the rear cutters being arranged to break joint with the front cutters. Each of the cutters comprises a long blade 42 and a short blade 43. The cutters attached to the middle bar 2 have their long blades extending to the left, whereas the cutters attached to the rear bar have the long blades arranged to the right. This disposition of the cutters neutralizes all tendency to side draft. In disposing the cutters the short blades overlap the long blades, as indicated most clearly in Fig. 2, thereby insuring covering of the ground throughout the track of the machine. When the main frame is level, the cutters operate to a like depth. By elevating the front portion of the frame the front cutters are raised and the rear cutters lowered, the former operating nearer to the surface of the ground, whereas the latter reach to a greater depth, so as to destroy roots penetrating a great depth below the surface.

The blades 42 and 43 of the cutters incline in opposite directions, and the standard E, carrying the cutter, is attached at its lower end to the latter at the juncture of the blades and inclines upwardly and rearwardly, as shown at 44, thence vertically, as indicated at 45, and terminating in a bent portion 46, which is widened and adapted to overlap the supporting-bar, to which it is attached in any substantial manner. A projection 47, extended rearward from the vertical portion 45 of the standard, is adapted to enter an opening in the front portion of the supporting-bar, so as to strengthen the connection between said standard and bar and to resist lateral strain. A bar 48 projects from the inclined portion 44 of the standard E in an upward, rearward, and lateral direction and terminates a short distance below the frame-bar to which the cutters are attached and is designed to catch the weeds and trash and carry the same for a short distance until released from the bar 48 from riding over the upper end thereof, when it catches upon the vertical portion 45 of the standard and clears the same by reason of the unequal tracks upon the end portions. The trash carried along by the bar 48 has its end portions of equal length, and such trash as may be caught by the vertical portion 45 of the standard E after clearing the bar 48 will have these end portions of unequal length by reason of the lateral distance of the upper extremity of the bar 48 from the part 45, and the tracks upon the dragging ends being unequal will result in ultimate disengagement of the trash from the standard E, as will be readily comprehended.

The driver's seat 49 is attached to a spring-arch 50, which spans the joint formed between the sections A and A', and has its extremities connected to the rear bars. The upper end of the operating-lever 9 extends within convenient reach of the driver's seat. A spring 51 coöperates with the operating-lever 9 and normally assists in sustaining the major portion of the load of the main frame, thereby enabling the driver to effect adjustment with comparative ease.

Having thus described the invention, what is claimed as new is—

1. In combination, an axle jointed in its length, a frame composed of sections jointed about in line with the joint of the axle, cutting mechanism applied to the sections of the frame, and means for raising and lowering the sections with reference to the axle.

2. In a weed-cutter, an axle jointed in its length, a frame composed of articulated sections having the line of flexion corresponding approximately with the joint of the axle, vertical guides extended from the frame-sections and receiving the axle, an operating-lever, and flexible connections between the operating-lever and the frame-sections for vertically adjusting the latter with reference to the axle.

3. In combination, an axle, a frame mounted upon the axle and provided with cutting mechanism, a draft-frame provided with a ground-support, a loose swinging connection between the draft-frame and main frame, operating means mounted upon the main frame for adjusting it vertically upon the axle, and other means between said operating means and the loose connection for swinging the latter in a vertical plane simultaneously with the vertical adjustment of the main frame.

4. In combination, an axle, a frame mounted upon the axle and provided with cutting mechanism, a draft-frame provided with a ground-support, a loose swinging connection between the draft-frame and main frame, operating means mounted upon the main frame for adjusting it vertically upon the axle, and means adjustably connecting the loose swinging connection with said operating means to admit of relative adjustment of the main and draft frames and to cause simultaneous movement of the draft-frame when adjusting the main frame vertically upon actuating said operating means.

5. In combination, an axle, a frame mounted upon the axle and provided with cutting mechanism, a draft-frame provided with a ground-support, a loose swinging connection between the draft-frame and main frame, operating means mounted upon the main frame for adjusting it vertically upon the axle, an adjusting-bar operatively connected with said operating means, and means adjustably connecting the loose swinging connection with said adjusting-bar.

6. In combination, an axle, a frame mounted upon the axle and provided with cutting mechanism, a draft-frame provided with a ground-support, a loose swinging connection between the draft-frame and main frame, operating means mounted upon the main frame for adjusting it vertically upon the axle, an adjusting-bar operatively connected with said operating means, connecting means 36 jointed to the loose swinging connection, and means adjustably connecting the part 36 with the adjusting-bar.

7. In combination, an axle, a vertically-adjustable main frame provided with means for acting upon the ground, a draft-frame provided with a ground-support, a loose connection between the two frames, an operating-lever for effecting vertical adjustment of the main frame, an adjusting-bar connected with said operating-lever for simultaneous movement therewith, and connecting means between said adjusting-bar and draft-frame to effect movement of the latter simultaneous with vertical adjustment of the main frame for holding the latter parallel to a given position during all stages of its vertical adjustment.

8. In combination, a vertically-adjustable main frame provided with earth-operating means, a draft-frame provided with a ground-support and loosely connected to the main frame, an operating-lever for effecting vertical adjustment of the main frame, an adjusting-bar connected with said operating-lever for simultaneous movement therewith, connecting means between the adjusting-bar and draft-frame, and means for varying the point of adjustment of said connecting means with the adjusting-bar, substantially as and for the purpose set forth.

In testimony whereof I affix my signature in presence of two witnesses.

AXEL N. CARLSON. [L. S.]

Witnesses:
  E. B. MANLY,
  JAHN A. SWONSAN.